(12) United States Patent
Ishikawa

(10) Patent No.: US 10,871,213 B2
(45) Date of Patent: Dec. 22, 2020

(54) STRAIN WAVE GEARING WITH COMPOUND MESHING THAT INVOLVES CONGRUITY OF TOOTH SURFACES

(71) Applicant: Harmonic Drive Systems Inc., Tokyo (JP)

(72) Inventor: Shoichi Ishikawa, Yokohama (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 675 days.

(21) Appl. No.: 15/576,088

(22) PCT Filed: Jun. 23, 2015

(86) PCT No.: PCT/JP2015/068032
§ 371 (c)(1),
(2) Date: Nov. 21, 2017

(87) PCT Pub. No.: WO2016/194239
PCT Pub. Date: Dec. 8, 2016

(65) Prior Publication Data
US 2018/0149255 A1 May 31, 2018

(30) Foreign Application Priority Data

Jun. 2, 2015 (JP) .................................. 2015-112632

(51) Int. Cl.
*F16H 49/00* (2006.01)
*F16H 55/08* (2006.01)
(52) U.S. Cl.
CPC ........... *F16H 49/001* (2013.01); *F16H 55/08* (2013.01); *F16H 55/088* (2013.01); *F16H 55/0833* (2013.01); *F16H 2049/003* (2013.01)
(58) Field of Classification Search
CPC .................................................... F16H 49/001
(Continued)

(56) References Cited

U.S. PATENT DOCUMENTS 2,906,143 A 9/1959 Musser
4,823,638 A 4/1989 Ishikawa
(Continued)

FOREIGN PATENT DOCUMENTS

JP 45-41171 12/1970
JP 63-115943 A 5/1988
(Continued)

OTHER PUBLICATIONS

International Search Report (PCT/ISA/210) dated Sep. 29, 2015, by the Japanese Patent Office as the International Searching Authority for International Application No. PCT/JP2015/068032.
(Continued)

*Primary Examiner* — Ha Dinh Ho
(74) *Attorney, Agent, or Firm* — Buchanan Ingersoll & Rooney PC

(57) ABSTRACT

The dedendum tooth profiles of the internal teeth and external teeth of a strain wave gearing are prescribed by a first homothetic curve BC and a second homothetic curve AC obtained from a curve segment from a point A, at which the angle formed by the tangent to a movement locus Mc when meshing is approximated by rack meshing and the major axis is ΘA, to a low point B. The dedendum tooth profile of the internal teeth is prescribed by a curve formed on the internal teeth in the course of the addendum tooth profile of the external teeth moving from an apex of the movement locus to point A. The dedendum tooth profile of the external teeth is prescribed by a curve formed on the external teeth when the addendum tooth profile of the internal teeth moves from the apex to arrive at point A.

5 Claims, 8 Drawing Sheets

(58) Field of Classification Search
USPC .......................................................... 74/640
See application file for complete search history.

(56) References Cited

U.S. PATENT DOCUMENTS

| | | | |
|---|---|---|---|
| 4,974,470 A | 12/1990 | Ishikawa et al. | |
| 5,458,023 A | 10/1995 | Ishikawa et al. | |
| 6,526,849 B1 * | 3/2003 | Ishikawa ............. | F16H 55/0833 74/457 |
| 7,117,759 B2 * | 10/2006 | Ishikawa ............. | F16H 55/0833 74/461 |
| 8,661,939 B2 * | 3/2014 | Ishikawa ............. | F16H 55/0833 74/640 |
| 8,661,940 B2 * | 3/2014 | Ishikawa ............. | F16H 55/0833 74/640 |
| 10,174,825 B2 * | 1/2019 | Ishikawa ............... | F16H 49/001 |
| 2014/0047937 A1 | 2/2014 | Ishikawa | |

FOREIGN PATENT DOCUMENTS

| | | |
|---|---|---|
| JP | 64-79448 A | 3/1989 |
| JP | 5456941 B1 | 4/2014 |
| WO | WO 94/012809 A1 | 6/1994 |
| WO | WO 2010/070712 A1 | 6/2010 |

OTHER PUBLICATIONS

Written Opinion (PCT/ISA/237) dated Sep. 29, 2015, by the Japanese Patent Office as the International Searching Authority for International Application No. PCT/JP2015/068032.

\* cited by examiner (A)

(B)

(C)

STRAIN WAVE GEARING WITH COMPOUND MESHING THAT INVOLVES CONGRUITY OF TOOTH SURFACES

TECHNICAL FIELD

The present invention relates to an improvement in the tooth profiles of a rigid internally toothed gear and a flexible externally toothed gear in a strain wave gearing.

BACKGROUND ART

Commonly, strain wave gearings have a rigid internally toothed gear, a flexible externally toothed gear coaxially disposed on the inner side of the internally toothed gear, and a wave generator fitted to the inner side of the externally toothed gear. (In the present specification, the rigid internally toothed gear and the flexible externally toothed gear are sometimes referred to simply as the internally toothed gear and the externally toothed gear, respectively.) Flat strain wave gearings comprise a flexible externally toothed gear in which external teeth are formed in the external peripheral surface of a flexible cylinder. The flexible externally toothed gears of cup-shaped and top-hat-shaped strain wave gearings comprise a flexible cylindrical barrel part, a diaphragm extending radially from the rear end of the cylindrical barrel part, and external teeth formed in the external peripheral surface portion of the front-end-opening side of the cylindrical barrel part. In a typical strain wave gearing, the circular flexible externally toothed gear is made to flex into an ellipsoidal shape by the wave generator, and both major-axis-directional ends of the ellipsoidally flexed flexible externally toothed gear mesh with the rigid internally toothed gear.

Since its invention by C. W. Musser (Patent Document 1), the strain wave gearing has been contrived in a variety of inventions and designs by many researchers including the present inventor, as well as Musser himself. There are even a variety of inventions related merely to the tooth profile of strain wave gearings. In Patent Document 2, the present inventor proposed using the basic tooth profile as an involute tooth profile, and in Patent Documents 3 and 4 proposed using a technique in which a rack is used to approximate the meshing of the teeth of a rigid internally toothed gear and a flexible externally toothed gear as a tooth-profile-designing method for deriving an addendum tooth profile for both gears, which have a large area of contact.

In the tooth portion of an ellipsoidally flexed flexible externally toothed gear of a cup-shaped or top-hat-shaped strain wave gearing, the amount of radial flexure increases along the tooth trace direction from the diaphragm side toward the front-end opening, substantially in proportion to the distance from the diaphragm. As the wave generator rotates, various portions of the tooth part of the flexible externally toothed gear repeatedly flex radially outward and inward. Such a flexing action of the flexible externally toothed gear caused by the wave generator is referred to as "coning."

When the flexible externally toothed gear is ellipsoidally deformed by the wave generator, a rim-neutral circle of the external teeth of the gear deforms into an ellipsoidal rim-neutral curve. At the major-axis positions of this rim-neutral curve, with w denoting the amount of flexure relative to the rim-neutral circle prior to deformation, the value resulting from dividing the rim-neutral circle by the reduction ratio of the strain wave gearing is referred to as the regular (standard) amount of flexure $w_o$. The ratio $w/w_o$ of these values is referred to as the deflection coefficient κ. The regular amount of flexure $w_o$ is referred to as "non-deflected flexure," flexure of a greater amount (κ>1) than the regular amount of flexure $w_o$ is referred to as "positive-deflection flexure," and flexure of a lesser amount (κ<1) than the regular amount of flexure $w_o$ is referred to as "negative-deflection flexure." With m denoting a module of the flexible externally toothed gear and n (a positive integer) denoting the difference in the number of teeth between the flexible externally toothed gear and the rigid internally toothed gear, the amount of flexure w is "2 κmn."

In Patent Document 5, the present inventor proposed a strain wave gearing comprising a tooth profile that enabled continuous meshing in consideration of coning of the teeth. In the strain wave gearing proposed in Patent Document 5, a desired transverse cross-section of the flexible externally toothed gear in the tooth trace direction is taken as a principal cross-section, and, in a position on the major axis of an ellipsoidal rim-neutral curve of the externally toothed gear in the principal cross-section, the degree of flexing w=2 κmn (where κ is a deflection coefficient, m is a module, and n is a positive integer) with respect to a rim-neutral circle prior to flexing is set such that flexing occurs in a non-deflected state at 2 mn (κ=1).

Using rack meshing to approximate meshing of the flexible externally toothed gear and the rigid internally toothed gear, in axially perpendicular cross-sections at positions including the principal cross-section in the tooth trace direction of the flexible externally toothed gear, movement loci of the teeth of the flexible externally toothed gear with respect to the teeth of the rigid internally toothed gear as the wave generator rotates are derived, a first homothetic curve is derived by scaling down, by λ (λ<1) using a bottom point as the homothetic center, a curve segment extending from a point of an apical part to the point in the next bottom part in a non-deflection movement locus obtained in the principal cross-section, and this first homothetic curve is adopted as the basic tooth profile for the addendum of the rigid internally toothed gear.

Furthermore, with the bottom point as one end point of the first homothetic curve and the end point on the side opposite the bottom point referred to as the opposite-side end point, a curve obtained by rotating the first homothetic curve 180 degrees about the opposite-side end point is multiplied by $(1-\lambda)/\lambda$ using the opposite-side end point as the homothetic center to derive a second homothetic curve, and this second homothetic curve is adopted as the basic tooth profile for the addendum of the flexible externally toothed gear.

Additionally, in the tooth profile of the flexible externally toothed gear, a profile shift is applied to the tooth profile portions on both sides of the principal cross-section in the tooth trace direction, so that both negative-deflection-side movement loci, which are obtained in axially perpendicular cross-sections flexed to a negative deflection state (deflection coefficient κ<1) toward the diaphragm side from the principal cross-section, and positive-deflection-side movement loci, which are obtained in axially perpendicular cross-sections flexed to a positive deflection state (deflection coefficient κ>1) toward the front-end-opening side from the principal cross-section, describe curves tangent to the bottom part of the non-deflection movement locus in the principal cross-section.

In a strain wave gearing in which the tooth profile is formed in this manner, not only do the addendum tooth profiles of both the external teeth and the internal teeth continuously mesh across a wide area in the principal cross-section of both gears, but it is also possible to achieve effective meshing of the addendum tooth profiles of both the external teeth and the internal teeth in the entire area along the tooth trace direction. Accordingly, it is possible to transmit a greater amount of torque than is possible with conventional strain wave gearings in which meshing occurs in a narrow tooth trace area.

PRIOR ART LITERATURE

Patent Documents

Patent Document 1: USP 2906143
Patent Document 2: JP 45-41171 B
Patent Document 3: JP 63-115943 A
Patent Document 4: JP 64-79448 A
Patent Document 5: WO2010/070712

DISCLOSURE OF THE INVENTION

Problems to be Solved by the Invention

Currently, there is strong demand in markets for improved load torque performance in strain wave gearings. To achieve this, the tooth profiles of the gears of a strain wave gearing must be reasonable tooth profiles that can continuously mesh together over a wider range than in the past.

An object of the present invention is to provide a flat strain wave gearing in which the tooth profiles are set so that teeth meshing is ensured over the entire course from the major axis to the minor axis of the ellipsoidal rim-neutral curve of the flexible externally toothed gear.

Another object of the present invention is to provide a cup-shaped or top-hat-shaped strain wave gearing in which the tooth profiles are set so that teeth meshing is ensured over the entire course from the major axis to the minor axis of the ellipsoidal rim-neutral curve of the flexible externally toothed gear, and the tooth profiles are set taking coning into account to enable meshing throughout the entire tooth trace of the flexible externally toothed gear.

Means of Solving the Problems

To solve the problems described above, in the flat strain wave gearing of the present invention, a flexible externally toothed gear, made to flex into an ellipsoidal shape, meshes with a rigid internally toothed gear in a non-deflected state of which a deflection coefficient κ is 1. The addendum tooth profiles of the externally toothed gear and the internally toothed gear are prescribed by first and second homothetic curves, which are obtained from a curve segment from a first point to a bottom point (having an angle $\pi$) of a movement locus, the first point being a point near an apex in the curve segment from the apex to the next bottom point in the movement locus of one tooth of the externally toothed gear when meshing is approximated by rack meshing, and the first point also being a point of a value (angle $\theta_A$) in a range where the angle formed by the tangent of the curve segment and the major axis is from 0 to $\pi$.

The first homothetic curve is obtained by taking a curve segment from one apex to the next bottom point of the movement locus, and scaling down a first curve segment in this curve segment by $\lambda$ ($0<\lambda<1$) using a second point as a homothetic center, the first curve segment extending from a first point to the second point, the first point being a point of an angle from 0 to $\pi$ formed by a tangent of the curve segment and the major axis, and the second point being the bottom point of the curve segment. The second homothetic curve is obtained by multiplying a curve by $(1-\lambda)/\lambda$ using a third point as the homothetic center, the curve being obtained by rotating the first homothetic curve 180 degrees about the third point, and the third point being an end point on the side opposite from the second point in the first homothetic curve.

The dedendum tooth profile of the internally toothed gear is prescribed by a curve formed on the internally toothed gear in the course by which the addendum tooth profile of the externally toothed gear moves from the apex of the movement locus to the first point. The dedendum tooth profile of the externally toothed gear is prescribed by a curve formed on the externally toothed gear when the addendum tooth profile of the internally toothed gear moves from the apex to arrive at the first point.

In the meshing of the externally toothed gear and the internally toothed gear, after the addendum tooth profile of the externally toothed gear has become congruous with the dedendum tooth profile of the internally toothed gear, the addendum tooth profile of the externally toothed gear continuously meshes with the addendum tooth profile of the internally toothed gear, and the addendum tooth profile of the internally toothed gear comes into contact so as to be congruous with the dedendum tooth profile of the externally toothed gear. Therefore, the meshing range of the two gears increases, and therefore more torque can be transmitted.

Next, in the cup-shaped or top-hat-shaped strain wave gearing of the present invention, the externally toothed gear meshes with the internally toothed gear in a non-deflected flexing state having a deflection coefficient κ of 1 in an axially perpendicular cross-section at a midway position in the tooth trace direction of the externally toothed gear. When the axially perpendicular cross-section where this non-deflected flexing state occurs is designated as the main cross-section, in this principal cross-section, the addendum tooth profile and dedendum tooth profile of the externally toothed gear, as well as the addendum tooth profile and dedendum tooth profile of the internally toothed gear, are set in the same manner as in the case of the flat strain wave gearing described above. In this case, the tooth profile set in the principal cross-section of the externally toothed gear is referred to as the basic external teeth profile.

At any position along the tooth trace direction from the principal cross-section of the externally toothed gear to the external teeth open end part, the externally toothed gear meshes with the internally toothed gear in a positive deflection flexed state having a deflection coefficient κ greater than 1. The tooth profile of a position in the positive deflection flexed state is a profile-shifted tooth profile obtained by making a profile shift to the basic external teeth profile, so that the vicinity of the apex of the movement locus described by the basic external teeth profile at any position is tangent to the vicinity of the apex of the movement locus described by the basic external teeth profile in the principal cross-section.

At any position along the tooth trace direction from the principal cross-section of the externally toothed gear to the external teeth inner end part, the externally toothed gear meshes with the internally toothed gear in a negative deflection flexed state having a deflection coefficient K of less than 1. The tooth profile of a position in the negative deflection meshing state is a profile-shifted tooth profile obtained by making a profile shift to the basic external teeth profile, so that the bottom part of the movement locus described by the basic external teeth profile at any position is tangent to the bottom part of the movement locus described by the basic external teeth profile in the principal cross-section.

In the meshing of the externally toothed gear and the internally toothed gear of which the tooth profiles are set in this manner, in the major axis positions of the ellipsoidally flexed externally toothed gear, after the addendum tooth profile of the externally toothed gear has become congruous with the dedendum tooth profile of the internally toothed gear, continuous meshing is formed with the addendum tooth profile of the internally toothed gear. Additionally, the addendum tooth profile of the internally toothed gear comes into contact so as to be congruous with the dedendum tooth profile of the externally toothed gear. Furthermore, even in meshing at positions other than the principal cross-section, the addendum tooth profile of the externally toothed gear meshes with the addendum tooth profile of the internally toothed gear throughout the entire tooth trace of the externally toothed gear. Thus, in the meshing of the two gears, the tooth surfaces of the internal teeth and the external teeth are congruous, and continuous meshing of the two gears is then formed. Consequently, the torque transmitted by the strain wave gearing can be increased, and the life of the strain wave gearing can be lengthened.

MODE FOR CARRYING OUT THE INVENTION (Configuration of Strain Wave Gearing)

Figure 1:
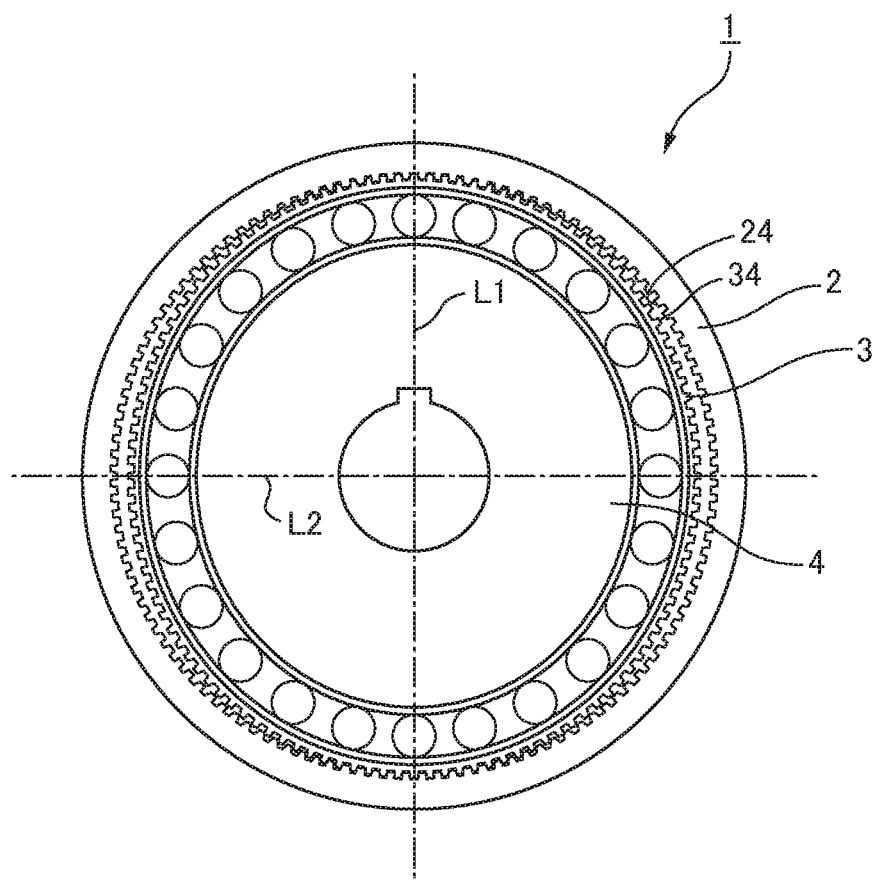
FIG. 1 is a schematic diagram of one example of a strain wave gearing to which the present invention has been applied.
Figure 2:
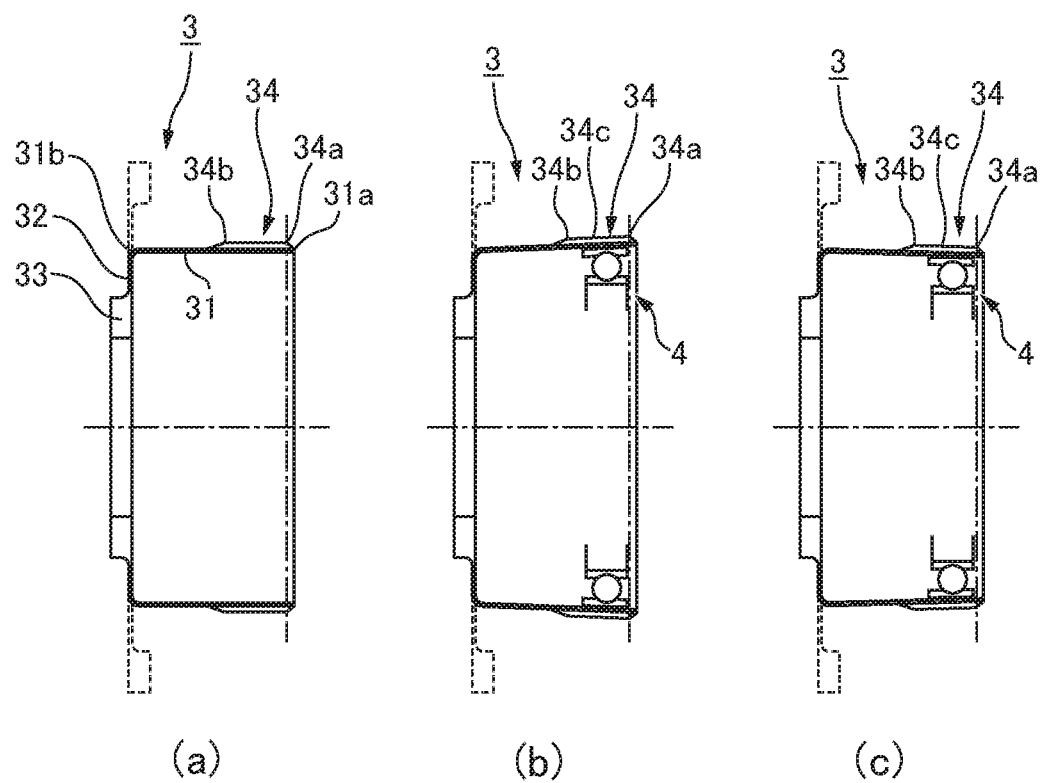
FIG. 2 includes explanatory drawings showing the manner in which cup-shaped and top-hat-shaped flexible externally toothed gears flex, where (a) shows a state prior to deformation, (b) shows a state of a cross-section including the major axis of an ellipsoidally deformed flexible externally toothed gear, and (c) shows the state of a cross-section including the minor axis of an ellipsoidally deformed flexible externally toothed gear.

FIG. 1 is a front view of a strain wave gearing, the subject of the present invention. FIG. 2 includes cross-sectional views showing the opening part of a flexible externally toothed gear of the strain wave gearing as being in the initial shape of a circular state, and the opening part as having been made to flex into an ellipsoidal shape. Specifically, FIG. 2(a) shows a state prior to deformation, FIG. 2(b) shows a cross-section including the ellipsoidal major axis after deformation, and FIG. 2(c) shows a cross-section including the ellipsoidal minor axis after deformation. In FIGS. 2(a)-(c), solid lines indicate the diaphragm and boss portions of a cup-shaped flexible externally toothed gear, and dashed lines indicate the diaphragm and boss portions of a top-hat-shaped flexible externally toothed gear.

As shown in these drawings, the strain wave gearing 1 has a rigid annular internally toothed gear 2, a flexible externally toothed gear 3 disposed within the internally toothed gear 2, and a wave generator 4 fitted within the externally toothed gear 3 that has an ellipsoidal contour. The rigid internally toothed gear 2 and the pre-deformation flexible externally toothed gear 3 are spur gears of modulus m. The difference in the number of teeth between the rigid internally toothed gear 2 and the flexible externally toothed gear 3 is 2n(n being a positive integer). The flexible externally toothed gear 3, of which the initial shape is a perfect circle, is made to flex into an ellipsoidal shape by the ellipsoidally contoured wave generator 4. At both end portions in a major axis L1 direction of the ellipsoidally flexed flexible externally toothed gear 3, the flexible externally toothed gear 3 meshes with the rigid internally toothed gear 2.

When the wave generator 4 is rotated, the positions in which both gears 2, 3 mesh move in the circumferential direction, and relative rotation is generated between both gears 2, 3 in accordance with the difference in the number of teeth of both gears. The flexible externally toothed gear 3 comprises a flexible cylindrical barrel part 31, a diaphragm 32 extending in the radial direction and continuous with a rear end 31b which is one end of the cylindrical barrel part 31, a boss 33 continuous with the diaphragm 32, and external teeth 34 formed in the external peripheral surface portion in the same side as an open end 31a which is the other end of the cylindrical barrel part 31.

The ellipsoidally contoured wave generator 4 is fitted in the internal circumferential surface portion of the external-tooth-formed portion of the cylindrical barrel part 31. The degree of flexing of the cylindrical barrel part 31 toward the outside or the inside in the radial direction from the diaphragm-side rear end 31b to the opening end 31a is gradually increased by the wave generator 4. In a cross-section including the major axis L1 of the ellipsoidal curve as shown in FIG. 2(b), the amount of outward flexure gradually increases in proportion to the distance from the rear end 31b toward the open end 31a. In a cross-section including the minor axis L2 of the ellipsoidal curve as shown in FIG. 2(c), the amount of inward flexure gradually increases in proportion to the distance from the rear end 31b toward the open end 31a. In the external teeth 34 formed in the external peripheral surface portion on the same side as the open end 31a, from an inner end part 34b of the tooth trace direction toward an open end part 34a, the amount of flexure increases in proportion to the distance from the rear end 31b.

In an axially perpendicular cross-section at any arbitrary position in the externally toothed gear 3 in the tooth trace direction of the external teeth 34, a circle that passes through the thickness-directional center of the bottom rim of the external teeth 34 prior to ellipsoidal flexing would be a rim-neutral circle. An ellipsoidal curve that passes through the thickness-directional center of the bottom rim after ellipsoidal flexing would be a rim-neutral curve. At the positions of the major axis L1 of an ellipsoidal rim-neutral curve, the amount of flexure w of the rim-neutral curve in the major-axis direction with respect to a rim-neutral circle is represented by 2 κmn, where κ (a real number including 1) is a deflection coefficient.

Specifically, with $Z_F$ denoting the number of teeth of the external teeth 34 of the flexible externally toothed gear 3, $Z_C$ denoting the number of teeth of the internal teeth 24 of the rigid internally toothed gear 2, and R $(=Z_F/(Z_C-Z_F)=Z_F/2n)$ denoting the reduction ratio of the strain wave gearing 1, a value resulting from dividing the pitch circle diameter $mZ_F$ of the flexible externally toothed gear 3 by the reduction ratio R ($mZ_F/R=2$ mn) is the regular (standard) amount of flexure $w_o$ in the major axis direction. The strain wave gearing 1 is generally designed so as to flex in the regular amount of flexure $w_o$ (=mn) in the region of the wave generator 4 where the centers of the balls of the wave bearing are positioned in the tooth trace direction of the flexible externally toothed gear 3. The deflection coefficient κ represents a value resulting from dividing the amount of flexure w in axially perpendicular cross-sections in the tooth trace direction of the flexible externally toothed gear 3 by the regular amount of flexure $w_o$. Therefore, in the external teeth 34, the deflection coefficient at the position where the regular amount of flexure $w_o$ is obtained is κ=1, the deflection coefficient at a cross-sectional position of a lesser amount of flexure w is κ<1, and the deflection coefficient at a cross-sectional position of a greater amount of flexure w is κ<1.

In the present invention, an axially perpendicular cross-section 34c at or near the tooth-trace-directional center in the external teeth 34 of the flexible externally toothed gear 3 is a cross-section where non-deflected flexure (κ=1) occurs. This reference axially perpendicular cross-section is referred to as the "principal cross-section 34c." Due to this configuration, in the external teeth 34 of the flexible externally toothed gear 3, negative-deflection flexure (κ<1) occurs at portions positioned nearer to the inner end part 34b in the tooth trace direction than the principal cross-section 34c, and positive-deflection flexure (κ>1) occurs at portions positioned nearer to the open end part 34a than the principal cross-section 34c.

Figure 3A:
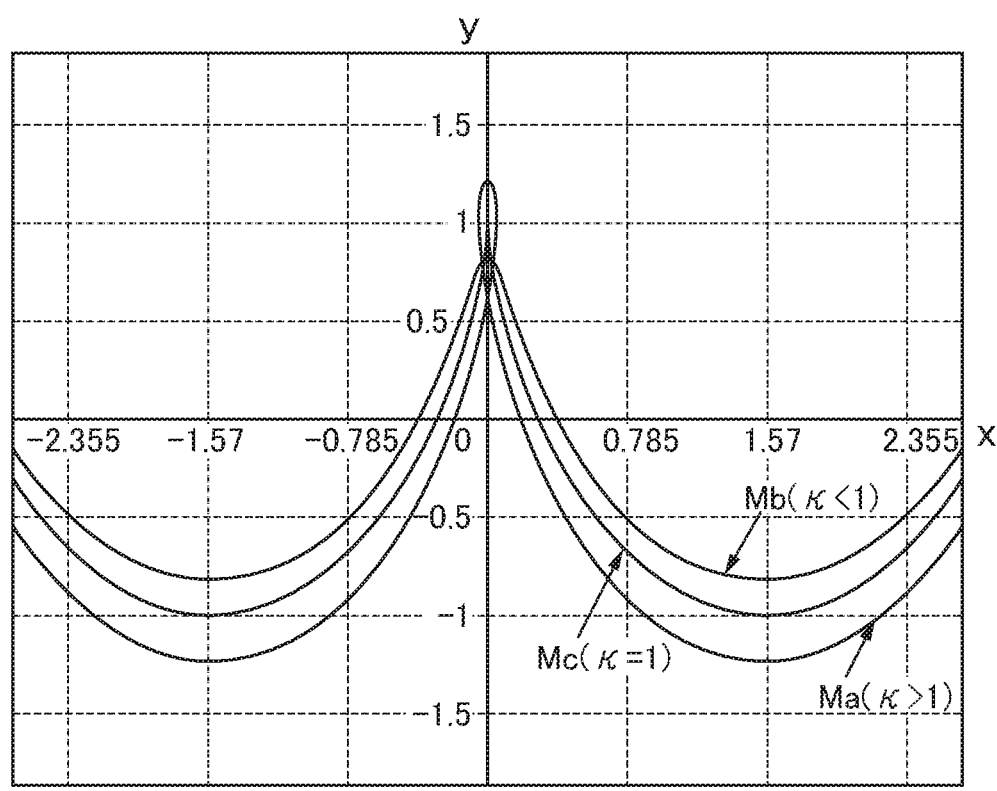
FIG. 3A is a graph showing movement loci of the external teeth obtained when the relative motions of the two gears are approximated with a rack at positions of the inner end part, the principal cross-section, and the open end part in the tooth trace direction of the external teeth.

FIG. 3A is a drawing showing movement loci of the external teeth 34 of the flexible externally toothed gear 3 relative to the internal teeth 24 of the rigid internally toothed gear 2, obtained when the relative motions of the two gears 2, 3 of the strain wave gearing 1 are approximated with a rack. In this graph, the x-axis represents the translation direction of the rack, and the y-axis represents a direction perpendicular thereto. The origin on the y-axis is the average position of the amplitude of the movement loci. The curve Ma is a movement locus obtained in the open end part 34a of the external teeth 34, and the curve Mb is a movement locus obtained in the inner end part 34b. The curve Mc is a movement locus obtained in any arbitrary position in the tooth trace direction from the open end part 34a to the inner end part 34b, which in the present example is the principal cross-section 34c taken near the center of the tooth trace direction. The movement locus of the external teeth 34 of the flexible externally toothed gear 3 relative to the internal teeth 24 of the rigid internally toothed gear 2 is given by the following formula.

$x = 0.5mn(\theta - \kappa \sin \theta)$ $y = \kappa mn \cos \theta$

For simplicity, the above formula is represented by formula 1 below when module m=1 and n=1 (difference in number of teeth 2n=2).

$x = 0.5(\theta - \kappa \sin \theta)$ $y = \kappa \cos \theta$ (Formula 1)

(Method of Forming Tooth Profile in Principal Cross-Section)

Figure 4:
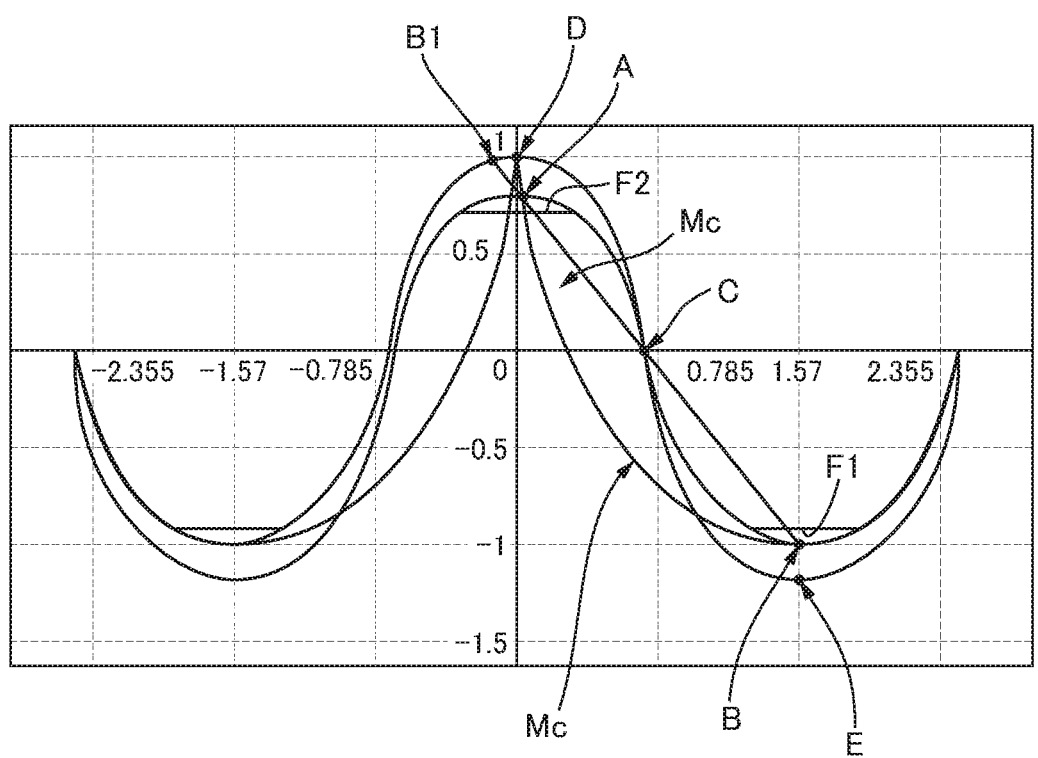
FIG. 4 is an explanatory drawing showing the principle of rack tooth profile formation of the present invention.

FIG. 4 is an explanatory drawing showing the principle of forming a rack tooth profile adopted as the tooth profile of the external teeth 34 and the internal teeth 24 in the principal cross-section. In the present invention, the movement locus Mc obtained in the principal cross-section 34c in the flexible externally toothed gear 3 is used to prescribe the addendum tooth profile in the principal cross-section 34c.

First, in the movement locus Mc shown in FIG. 4, a curve segment from the apex to the next bottom point in the movement locus Mc is taken. Points in this curve segment where the angle at which the tangent of the movement locus Mc is the major axis (the vertical axis in FIG. 4) is $\theta_A$ and π ($0 < \theta_A < \pi$) are, respectively, point A (first point) and point B (second point). Point B is the bottom point in the movement locus Mc. The portion of the range from point A to point B in the movement locus Mc is a first curve AB.

The first curve AB is subjected to similarity transformation (scaled down) by λ ($0 < \lambda < 1$) using point B, one end point of the first curve AB, as the homothetic center, to obtain a first homothetic curve BC. The first homothetic curve BC is adopted for the addendum tooth profile of the internal teeth 24 of the rigid internally toothed gear 2. FIG. 4 shows a case in which λ=0.55.

Next, the first homothetic curve BC is rotated 180 degrees about point C (a third point), which is the end point on the side opposite from point B in the first homothetic curve BC, and a curve $B_1C$ is obtained. This curve $B_1C$ is subjected to similarity transformation by (1−λ)/λ, using point C as the homothetic center, to obtain the second homothetic curve CA. This second homothetic curve CA is adopted as the addendum tooth profile in the external teeth 34 of the flexible externally toothed gear 3.

The basic formula for the addendum tooth profiles of the rigid internally toothed gear and the flexible externally toothed gear set in this manner is as follows.

<Basic Formula of Addendum Tooth Profile of Rigid Internally Toothed Gear>

$x(\theta) = 0.5\{(1-\lambda)\pi + \lambda(\theta + \sin \theta)\}$ $y(\theta) = \lambda(1 + \cos \theta) - 1$ $\theta_A \leq \theta \leq \pi$ (Formula 2)

<Basic Formula of Addendum Tooth Profile of Flexible Externally Toothed Gear>

$x(\theta) = 0.5\{(1-\lambda)(\pi - \theta + \sin \theta) + \theta_A - \sin \theta_A\}$ $y(\theta) = \cos \theta_A - (1+\lambda)(1 + \cos \theta)$ $\theta_A \leq \theta \leq \pi$ (Formula 3)

Next, in the course by which the addendum tooth profile of the flexible externally toothed gear 3 set in the manner described above moves to point A described above from point D on the major axis, which is the apex of the movement locus Mc, the curve formed in the rigid internally toothed gear 2 is established as the dedendum tooth profile of the rigid internally toothed gear 2. When the addendum tooth profile of the rigid internally toothed gear 2 moves from the same point D to point A, the curve formed in the flexible externally toothed gear 3 is established as the dedendum tooth profile of the flexible externally toothed gear 3.

Specifically, the principal part of the dedendum tooth profile of the rigid internally toothed gear 2, which is congruous with the addendum tooth profile of the flexible externally toothed gear in the bottom part of the teeth, is given by the following formula 4, which is derived from formula 3.

$x(\theta)=0.5(1-\lambda)(\pi-\theta+\sin\theta)$ $y(\theta)=\lambda-(1-\lambda)\cos\theta$ $\theta_A \leq \theta \leq \pi$ (Formula 4)

The transitional curve from the end point of this tooth profile to the addendum tooth profile of the rigid internally toothed gear is given by the following formula 5, which is derived from formulas 1 and 3.

$x(\theta)=0.5\{\theta-\sin\theta+(1-\lambda)(\pi-\theta_A+\sin\theta_A)\}$ $y(\theta)=\cos\theta-(1-\lambda)(1+\cos\theta_A)$ $\theta_A \leq \theta \leq \pi$ (Formula 5)

Similarly, in the course by which the addendum tooth profile of the rigid internally toothed gear 2 moves to point A from point D on the major axis of the movement locus Mc, the curve formed in the flexible externally toothed gear 3 is the dedendum tooth profile of the flexible externally toothed gear. The principal part of this dedendum tooth profile, which is congruous with the addendum tooth profile of the rigid internally toothed gear in the bottom part of the teeth, is shown by the following formula 6, which is derived from formula 2.

$x(\theta)=0.5\{(1-\lambda)\pi+\lambda(\theta-\sin\theta)+\theta_A-\sin\theta_A\}$ $y(\theta)=\lambda(1-\cos\theta)-2+\cos\theta_A$ $\theta_A \leq \theta \leq \pi$ (Formula 6)

The transitional curve between the end point of this tooth profile and the addendum tooth profile of the flexible externally toothed gear is given by the following formula 7, which is derived from formulas 1 and 2.

$x(\theta)=0.5\{\theta-\sin\theta-(1-\lambda)\pi+\lambda(\theta_A-\sin\theta_A)\}$ $y(\theta)=\cos\theta-2+\lambda(1+\cos\theta_A)$ $\theta_A \leq \theta \leq \pi$ (Formula 7)

The curve BCD shown in FIG. 4 shows the basic tooth profile shape of the internal teeth 24 having the addendum tooth profile and dedendum tooth profile set as described above, and the curve ACE shows the basic tooth profile shape of the external teeth 34 having the addendum tooth profile and dedendum tooth profile set as described above. The actual addendum tooth profiles of the gears 2, 3 are modified so as to slightly lower the tooth tip from the tooth tip profile in order to ensure clearance with the dedendum tooth profile of the meshing gear. For example, a modification shown by the straight lines F1, F2 is made as shown in FIG. 4.

In this embodiment, the tooth profile of the rigid internally toothed gear 2, which has the same shape in the tooth trace direction, is prescribed by the dedendum tooth profile described above, and a modified addendum tooth profile that is modified to have a slightly lower tooth tip than the addendum tooth profile described above to ensure clearance with the dedendum tooth profile of the external teeth.

In a reference axially perpendicular cross-section of the strain wave gearing, the tooth profile of the flexible externally toothed gear 3, similar to that of the rigid internally toothed gear, is prescribed by the dedendum tooth profile described above, and a modified addendum tooth profile, which is modified from the addendum tooth profile established as described above in order to ensure clearance with the dedendum tooth profile of the internal teeth.

In the case of a cup-shaped or top-hat-shaped flexible externally toothed gear used in a cup-shaped or top-hat-shaped strain wave gearing, the addendum tooth profile is prescribed by the dedendum tooth profile described above, and a modified addendum tooth profile which is modified to have a slightly lower tooth tip than the addendum tooth profile established as described above in order to ensure clearance with the dedendum tooth profile of the internal teeth, in a position of the principal cross-section 34c which is a reference axially perpendicular cross-section. Referring to the tooth profile of the principal cross-section 34c as the basic external teeth profile, a profile-shifted tooth profile is attained by making a profile shift corresponding to the amount of flexure to the basic external teeth profile, as described below, in any axially perpendicular cross-section other than the principal cross-section 34c.

(Method of Forming External Teeth Profile in Position Other than Principal Cross-Section)

A profile shift corresponding to the value of the deflection coefficient κ is made to the tooth profile of the flexible externally toothed gear 3, from the principal cross-section 34c to the open end part 34a of the external teeth 34, and also from the principal cross-section 34c to the inner end part 34b. Denoting the profile shift amount applied to the external teeth 34 as mnh, the profile shift amount is h when m=1 and n=1. In the principal cross-section 34c, because the deflection coefficient κ=1, the movement locus and the profile shift amount at any position of the profile-shifted tooth profile in the tooth trace direction are given by the following formula 1A.

$x=0.5(\theta-\kappa\sin\theta)$ $y=\kappa\cos\theta+h$ $h=-|1-\kappa|$ $-\pi \leq \theta \leq \pi$ (Formula 1A)

Figure 3B:
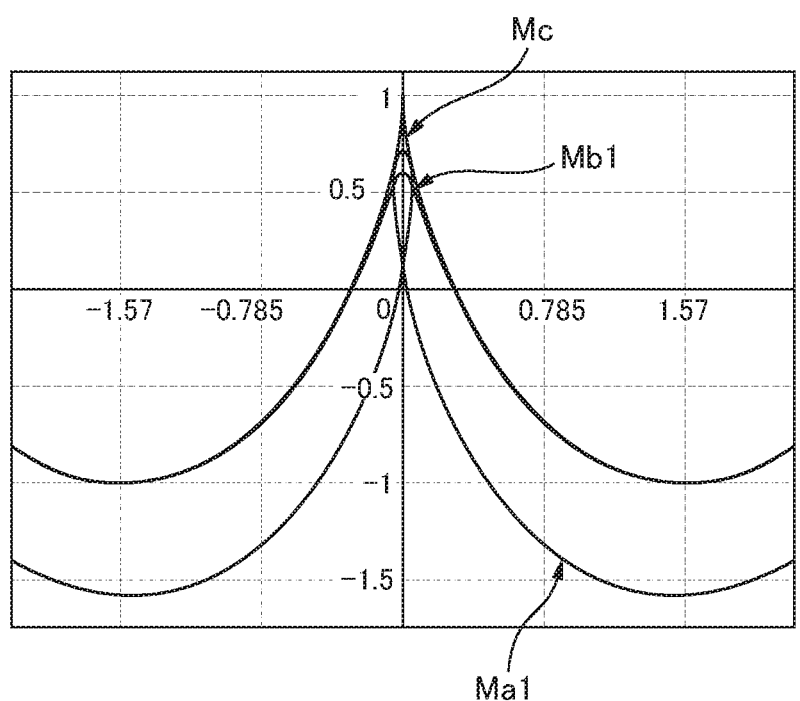
FIG. 3B is a graph showing movement loci of profile-shifted external teeth obtained when the relative motions of the two gears are approximated with a rack at positions of the inner end part, the principal cross-section, and the open end part in the tooth trace direction of the external teeth.

This profile shift causes the movement locus Ma of the open end part 34a and the movement locus Mb of the inner end part 34b shown in FIG. 3A to change to the movement loci Ma1, Mb1, respectively, shown in FIG. 3B. Specifically, from the principal cross-section 34c to the open end part 34a, the vicinity of the apex of the movement locus at any position of the external teeth 34 is congruous with the vicinity of the apex of the movement locus Mc in the principal cross-section 34c. From the principal cross-section 34c to the inner end part 34b, the bottom part of the movement locus at any position of the external teeth 34 is congruous with the bottom part of the movement locus Mc in the principal cross-section 34c.

Thus, in the flexible externally toothed gear 3, the tooth profile of a position other than the principal cross-section 34c in the tooth trace direction is a profile shift of the basic external teeth profile in the principal cross-section 34c, in which a profile shift is made in a profile shift amount h given by the third formula of formula 1A.

Figure 5:
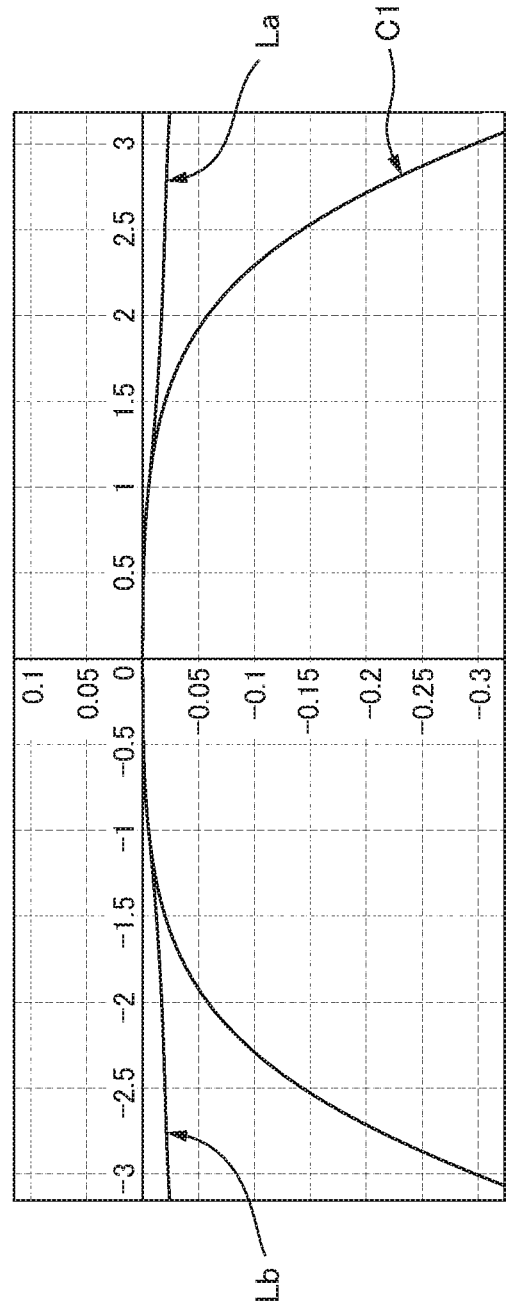
FIG. 5 is a graph showing the shape of the middle vicinity of the tooth trace of the flexible externally toothed gear

FIG. 5 is a graph showing an example of the profile shift amount near the center of the tooth trace direction of the flexible externally toothed gear 3. The horizontal axis of this graph represents the distance from the center (principal cross-section) of the tooth trace direction of the external teeth 34, and the vertical axis represents the profile shift amount h. The profile shift amount h is indicated by profile shift straight lines La, Lb, which have the same slope. The profile shift straight line La indicates the profile shift amount from the principal cross-section 34c to the open end part 34a, and the profile shift straight line Lb indicates the profile shift amount from the principal cross-section 34c to the inner end part 34b.

FIG. 5 also shows a quaternary curve C1 of which the principal cross-section 34c is the apex and which is tangent to the profile shift straight lines La, Lb. When the profile shift amount at any position is determined on the basis of this quaternary curve C1, a substantially flat part is formed in the center portion along the tooth trace direction including the principal cross-section 34c in the external teeth 34; therefore, a smooth change in the profile shift is guaranteed, and it is easy to manage dimensions when cutting teeth into the flexible externally toothed gear 3.

Figure 6:
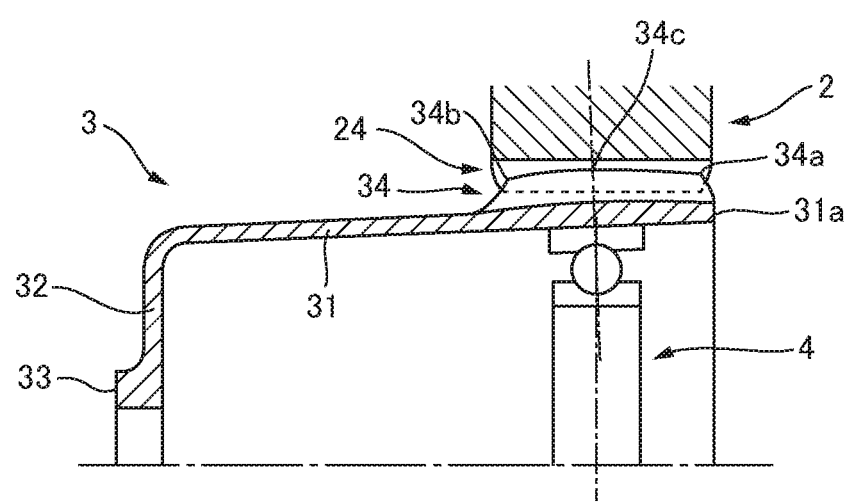
FIG. 6 is an explanatory drawing showing the contour in the tooth trace direction of a tooth of the profile-shifted flexible externally toothed gear.

FIG. 6 is an explanatory drawing showing the tooth profile contours along the tooth trace direction of the external teeth 34 and the internal teeth 24. This drawing shows the state of a cross-section including the major axis when the two gears are meshed (the state of deepest meshing). The tooth profile contour along the tooth trace direction of the external teeth 34 is prescribed by the above-described quaternary curve C1 in the center portion along the tooth trace direction including the principal cross-section 34c, by the profile shift straight line La in the portion from the center to the open end part 34a, and by the profile shift straight line Lb in the portion from the center to the inner end part 34b.

Figure 7:
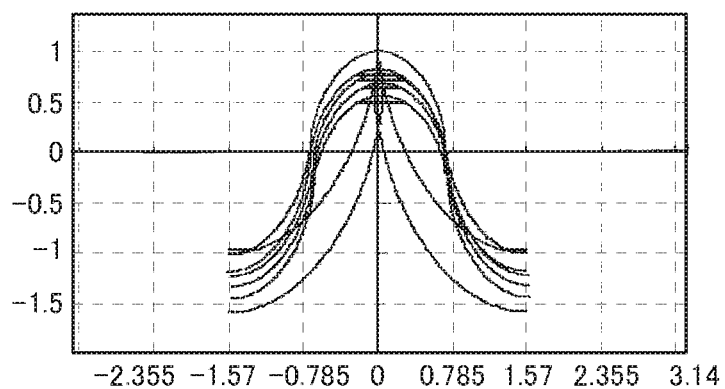
FIGS. 7(A), (B), and (C) are explanatory drawings showing movement loci of the teeth of the flexible externally toothed gear, and rack-approximated meshing of the flexible externally toothed gear and the rigid internally toothed gear, in the open end part, the principal cross-section, and the inner end part, respectively.
Figure 7:
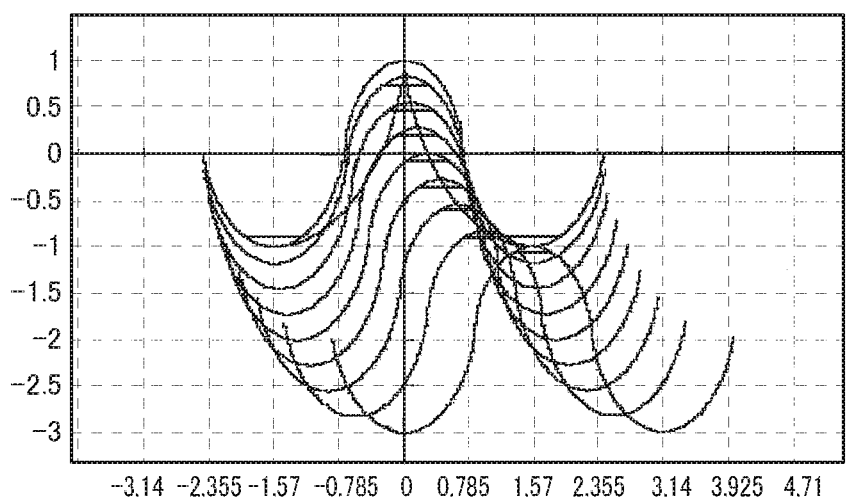
Figure 7:
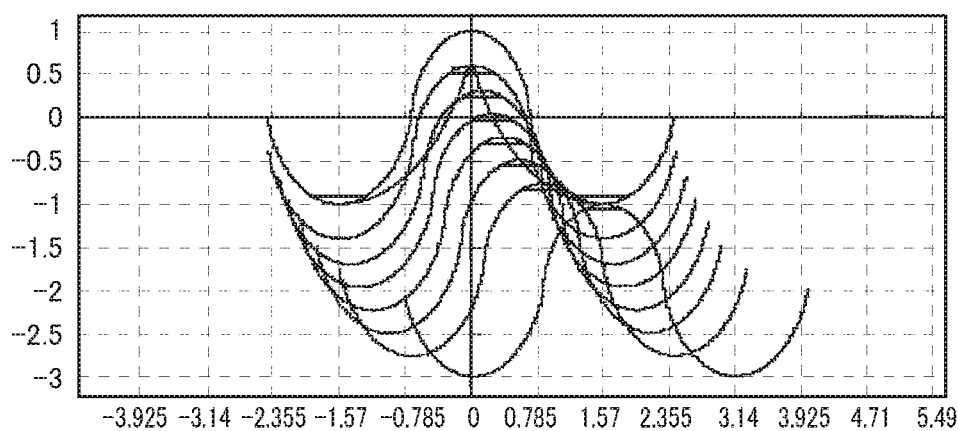

FIGS. 7(A), (B), and (C) are explanatory drawings using rack approximation to show the manner in which the external teeth 34 and the internal teeth 24 mesh with the tooth profiles designed as described above. FIG. 7(A) is obtained at the position of the open end part 34a of the external teeth 34, FIG. 7(B) is obtained at the principal cross-section position of the external teeth 34, and FIG. 7(C) is obtained at the position of the inner end part 34b of the external teeth 34. As can be understood from these movement loci, approximately speaking, the external teeth 34 of the flexible externally toothed gear 3 make sufficient contact with the internal teeth 24 in all positions from the open end part 34a, through the principal cross-section 34c, to the inner end part 34b.

As is described above, in the strain wave gearing 1, effective meshing between the two gears can be achieved through the entire range of the tooth trace of the flexible externally toothed gear 3. It is thereby possible to achieve a strain wave gearing capable of transmitting more torque.

The invention claimed is:

1. A strain wave gearing with compound meshing that involves congruity of tooth surfaces, the strain wave gearing comprising: a rigid internally toothed gear; a flexible externally toothed gear disposed coaxially within the rigid internally toothed gear; and a wave generator fitted within the flexible externally toothed gear;
    wherein the flexible externally toothed gear is made to flex into an ellipsoidal shape by the wave generator, and external teeth of the flexible externally toothed gear mesh with internal teeth of the rigid internally toothed gear at both ends of the ellipsoidal shape along a major axis direction;
    a number of teeth of the flexible externally toothed gear is 2 n less than a number of teeth of the rigid internally toothed gear, where n is a positive integer;
    the rigid internally toothed gear and the flexible externally toothed gear before being flexed are spur gears of modulus m;
    an amount of flexure, relative to a pre-flexure rim-neutral circle on a major axis in an ellipsoidal rim-neutral curve of the flexible externally toothed gear in an axially perpendicular cross-section at an arbitrary position in a tooth trace direction of the external teeth, is 2 κmn, where κ is a deflection coefficient; and
    the deflection coefficient in a principal cross-section is set to 1, the principal cross-section being an axially perpendicular cross-section at a position on the external teeth midway in the tooth trace direction; and,
    wherein an addendum tooth profile of the internal teeth is prescribed by a first homothetic curve, and a dedendum tooth profile of the internal teeth is prescribed by a first tooth profile curve;
    an addendum tooth profile of the external teeth is prescribed by a second homothetic curve, and a dedendum tooth profile of the external teeth is prescribed by a second tooth profile curve;
    the first and second homothetic curves are obtained based on a movement locus through which the external teeth move relative to the internal teeth as the wave generator rotates at each position of the external teeth in the tooth trace direction, when the meshing of the external teeth and the internal teeth is approximated by rack meshing;
    the first homothetic curve is obtained by taking a curve segment of the movement locus from one apex to a next bottom point, and scaling down a first curve segment in this curve segment by λ (0<λ<1) using a second point as a homothetic center, the first curve segment extending from a first point to the second point, the first point being a point of an angle $\theta_A$ from 0 to π formed by a tangent of the curve segment and a major axis of the rim-neutral curve, and the second point being the bottom point of the curve segment;
    the second homothetic curve is obtained by multiplying a curve by (1−λ)/λ using a third point as a homothetic center, the third point being an end point on a side opposite from the second point in the first homothetic curve, and the curve being obtained by rotating the first homothetic curve 180 degrees about the third point;
    the first tooth profile curve is formed on the internal teeth in the course by which the addendum tooth profile of the external teeth, prescribed by the second homothetic curve, moves from the apex of the movement locus to arrive at the first point; and
    the second tooth profile curve is formed on the external teeth when the addendum tooth profile of the internal teeth, prescribed by the first homothetic curve, moves from the apex of the movement locus to arrive at the first point.

2. The strain wave gearing according to claim 1,
    wherein the flexible externally toothed gear comprises a flexible cylindrical barrel part, and a diaphragm extending radially from a rear end of the cylindrical barrel part, the external teeth being formed in an external peripheral surface portion of a front-end-opening side of the cylindrical barrel part;
    an amount of flexure of the external teeth increases along the tooth trace direction of the external teeth from an external teeth inner end part on a side of the diaphragm toward an external teeth open end part on a side of the front-end opening, in proportion to a distance from the diaphragm;
    a state of flexure in the external teeth in an axially perpendicular cross-section from the principal cross-section to the external teeth open end part on the side of the front-end opening is positive deflection flexure having the deflection coefficient κ greater than 1, and a state of flexure in an axially perpendicular cross-section from the principal cross-section along the tooth trace direction to the external teeth inner end part on the side of the diaphragm is negative deflection flexure having the deflection coefficient κ less than 1;

the tooth profile shape of the external teeth in a position other than the principal cross-section along the tooth trace direction is a profile-shifted tooth profile achieved by making a profile shift corresponding to the amount of flexure to a basic external tooth profile prescribed by the second homothetic curve and the second tooth profile curve in the principal cross-section;

the tooth profile shape of the external teeth at each position in an axially perpendicular cross-section along the tooth trace direction from the principal cross-section to the external teeth open end part is obtained by making a profile shift to the basic external teeth profile, so that a vicinity of the apex of the movement locus described by the basic external teeth profile at the position is tangent to the vicinity of the apex of the movement locus described by the basic external teeth profile in the principal cross-section; and the tooth profile shape of the external teeth at each position in an axially perpendicular cross-section along the tooth trace direction from the principal cross-section to the external teeth inner end part is obtained by making a profile shift to the basic external teeth profile, so that the bottom part of the movement locus described by the basic external teeth profile at the position is tangent to the bottom part of the movement locus described by the basic external teeth profile in the principal cross-section.

3. The strain wave gearing according to claim 1,
wherein a modification that slightly lowers tooth tips is made to teeth depths in both the addendum tooth profile of the internal teeth and the addendum tooth profile of the external teeth, so that a required clearance with the dedendum tooth profile of the other gear is ensured.

4. The strain wave gearing according to claim 1,
wherein the movement locus is given by the following formula 1 when θ is a rotational angle of the wave generator on plane coordinates in which an x axis is a translation direction of a rack and a y axis is a direction perpendicular thereto, when the modulus m is 1 and the difference in the number of teeth is 2:

$x = 0.5(\theta - \kappa \sin \theta)$ $y = \kappa \cos \theta;$ (Formula 1)

the addendum tooth profile of the internal teeth in the principal cross-section is given by the following formula 2:

$x(\theta) = 0.5\{(1-\lambda)\pi + \lambda(\theta - \sin\theta)\}$ $y(\theta) = \lambda(1 + \cos \theta) - 1$ (Formula 2)

where $\theta_A \leq \theta \leq \pi;$ the addendum tooth profile of the external teeth in the principal cross-section is given by the following formula 3:

$x(\theta) = 0.5\{(1-\lambda)(\pi - \theta + \sin \theta) + \theta_A - \sin \theta_A\}$ $y(\theta) = \cos \theta_A - (1-\lambda)(1 + \cos \theta)$ (Formula 3)

where $\theta_A \leq \theta \leq \pi;$ a main part of the dedendum tooth profile of the internal teeth is congruous with the addendum tooth profile of the external teeth in the bottom part of the internal teeth, and is given by the following formula 4 derived from formula 3:

$x(\theta) = 0.5(1-\lambda)(\pi - \theta + \sin \theta)$ $y(\theta) = \lambda - (1-\lambda) \cos \theta$ (Formula 4)

where $\theta_A \leq \theta \leq \pi,$ a curve of transition from the end point of the principal part of the dedendum tooth profile given by formula 4, to the addendum tooth profile of the internal teeth given by formula 2 is given by the following formula 5 derived from formulas 1 and 3:

$x(\theta) = 0.5\{\theta - \sin \theta + (1-\lambda)(\pi - \theta_A + \sin \theta_A)\}$ $y(\theta) = \cos \theta - (1-\lambda)(1 + \cos \theta_A)$ (Formula 5)

where $\theta_A \leq \theta \leq \pi;$ a main part of the dedendum tooth profile of the external teeth is congruous with the addendum tooth profile of the internal teeth in the bottom part of the external teeth, and is given by the following formula 6 derived from formula 2:

$x(\theta) = 0.5\{(1-\lambda)\pi + \lambda(\theta - \sin \theta) + \theta_A - \sin \theta_A\}$ $y(\theta) = \lambda(1 + \cos \theta) - 2 + \cos \theta_A$ (Formula 6)

where $\theta_A \leq \theta \leq \pi,$ and the curve of transition from the end point of the dedendum tooth profile given by formula 6, to the addendum tooth profile of the external teeth given by formula 3 is given by the following formula 7 derived from formulas 1 and 2:

$x(\theta) = 0.5\{\theta - \sin \theta + (1-\lambda)\pi + \lambda(\theta_A - \sin \theta_A)\}$ $y(\theta) = \cos \theta - 2 + \lambda(1 + \cos \theta_A)$ (Formula 7)

where $\theta_A \leq \theta \leq \pi.$

5. The strain wave gearing according to claim 4,
wherein a modification is made to tooth depths in both the addendum tooth profile of the internal teeth and the addendum tooth profile of the external teeth, so that a required clearance with the dedendum tooth profile of the other gear is ensured.

* * * * *